US012786792B2

(12) United States Patent
Singh et al.

(10) Patent No.: US 12,786,792 B2
(45) Date of Patent: Nov. 3, 2026

(54) METHODS, SYSTEMS, AND COMPUTER READABLE MEDIA FOR ROUTING, ALTERNATE ROUTING, AND LOAD BALANCING OF SERVICE-BASED INTERFACE (SBI) REQUEST MESSAGES TO NETWORK FUNCTIONS (NFs) LOCATED IN DIFFERENT REGIONS USING SERVICE COMMUNICATION PROXY (SCP)

(71) Applicant: Oracle International Corporation, Redwood Shores, CA (US)

(72) Inventors: Virendra Singh, Bangalore (IN); Shashikiran Bhalachandra Mahalank, Bangalore (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 82 days.

(21) Appl. No.: 18/932,574

(22) Filed: Oct. 30, 2024

(65) Prior Publication Data

US 2026/0122535 A1 Apr. 30, 2026

(51) Int. Cl.
*H04W 28/084* (2023.01)

(52) U.S. Cl.
CPC ................................ *H04W 28/084* (2023.05)

(58) Field of Classification Search
CPC .................................................. H04W 28/084
See application file for complete search history.

(56) References Cited

U.S. PATENT DOCUMENTS 10,833,938 B1 11/2020 Rajput et al.
12,627,743 B2 5/2026 Jayaramachar et al.
(Continued)

FOREIGN PATENT DOCUMENTS

EP 3855705 A1 7/2021
WO WO 2025017590 A1 1/2025

OTHER PUBLICATIONS

"3rd Generation Partnership Project; Technical Specification Group Core Network and Terminals; 5G System; Network Function Repository Services; Stage 3 (Release 19)", 3GPP TS 29.510, V19.0.0, pp. 1-435 (Sep. 2024).

(Continued)

*Primary Examiner* — Christopher B Robinson
*Assistant Examiner* — Tania M Pena-Santana
(74) *Attorney, Agent, or Firm* — Jenkins, Taylor & Hunt, P.A.

(57) ABSTRACT

A method for routing, alternate routing, or load balancing of SBI request messages among NFs that are members of the same NF set and located in different regions using an SCP includes actively learning NF topology information of NFs that are located in the different regions. The method further includes receiving an SBI request message and determining an NF set-Id of a first target NF of the SBI request message, the first target NF being located in a first region. The method further includes using the NF set-Id and the NF topology information to identify at least one second target NF that is in the same NF set as the first target NF and located in a different region from the first region. The method further includes routing, alternate routing, or load balancing the SBI request message to at least one of the first target NF and the at least one second target NF.

20 Claims, 13 Drawing Sheets

(56) References Cited

U.S. PATENT DOCUMENTS

| | | | | |
|---|---|---|---|---|
| 2021/0112012 | A1* | 4/2021 | Krishan | H04L 47/29 |
| 2022/0053372 | A1* | 2/2022 | Shekhar | H04L 41/40 |
| 2022/0322053 | A1* | 10/2022 | Das | H04L 41/0893 |
| 2022/0393971 | A1* | 12/2022 | Bartolome Rodrigo | H04L 45/02 |
| 2023/0022955 | A1* | 1/2023 | Rajput | H04L 47/12 |
| 2024/0064197 | A1 | 2/2024 | Rodrigo et al. | |
| 2025/0323980 | A1 | 10/2025 | Jayaramachar et al. | |

OTHER PUBLICATIONS

"3rd Generation Partnership Project; Technical Specification Group Services and System Aspects; System architecture for the 5G System (5GS); Stage 2 (Release 19)", 3GPP TS 23.501, V19.1.0, pp. 1-735 (Sep. 2024).

Notice of Allowance for U.S. Appl. No. 18/637,423 (Mar. 17, 2026).

Ex-Parte Quayle Action for U.S. Appl. No. 18/637,423 (Nov. 6, 2025).

Non-Final Office Action for U.S. Appl. No. 18/637,423 (Jun. 25, 2025).

Examiner-Initiated Interview Summary for U.S. Appl. No. 18/637,423 (Jun. 5, 2025).

"3rd Generation Partnership Project; Technical Specification Group Core Network and Terminals; 5G System; Network Function Repository Services; Stage 3 (Release 18)", 3GPP TS 29.510, V18.6.0 (Mar. 2024).

"3rd Generation Partnership Project; Technical Specification Group Services and System Aspects; System architecture for the 5G System (5GS); Stage 2 (Release 18)", 3GPP TS 23.501, V18.5.0 (Mar. 2024).

* cited by examiner

METHODS, SYSTEMS, AND COMPUTER READABLE MEDIA FOR ROUTING, ALTERNATE ROUTING, AND LOAD BALANCING OF SERVICE-BASED INTERFACE (SBI) REQUEST MESSAGES TO NETWORK FUNCTIONS (NFs) LOCATED IN DIFFERENT REGIONS USING SERVICE COMMUNICATION PROXY (SCP)

TECHNICAL FIELD

The subject matter described herein relates to routing messages to NFs. More particularly, the subject matter described herein relates to methods, systems, and computer readable media for routing, alternate routing, and load balancing of SBI request messages to NFs located in different regions using an SCP.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with an NF repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instance.

One issue that can arise in 5G, previous generation, and subsequent generation networks is that producer NFs in the same NF set can be georedundantly deployed in different regions, registered with different NRFs, and NF service consumers may lack visibility of the producer NFs deployed in the different regions for routing, alternate routing, or load balancing. For example, an NF service consumer can obtain NF profiles of producer NFs capable of processing a service-based interface (SBI) request through the NF discovery service operation. However, an NRF can only respond to an NF discovery request with NF profiles of producer NFs that are registered with the NRF, which typically includes only producer NFs located in the same region as the NRF. If an NF service producer is registered with a regional NRF and its georedundantly deployed NF set mate is registered with a different regional NRF, an NF discovery service operation to either NRF will fail to discover the NF set mate. As a result, an NF service consumer that obtains NF profiles from one of the NRFs through the NF discovery service operation will fail to learn about georedundantly deployed NF set mates in other regions, and routing, alternate routing, or load balancing to the NF set mates deployed in the other regions will not be possible.

Accordingly, in light of these and other difficulties, there exists a need for improved methods, systems, and computer readable media for discovering and using NF topology information for NFs that are registered with different NRFs located in different regions.

SUMMARY

A method for routing, alternate routing, or load balancing of service-based interface (SBI) request messages among network functions (NFs) that are members of the same NF set and that are located in different regions using a service communication proxy (SCP) includes actively learning, by an SCP and from NF repository functions (NRFs) located in different regions, NF topology information, including NF profiles, of NFs that are located in the different regions. The method further includes receiving, by the SCP and from a consumer NF, an SBI request message. The method further includes determining, by the SCP, an NF set-Id of a first target NF of the SBI request message, the first target NF being located in a first region. The method further includes using, by the SCP, the NF set-Id and the NF topology information to identify at least one second target NF that is in the same NF set as the first target NF and located in a different region from the first region. The method further includes routing, alternate routing, or load balancing the SBI request message to at least one of the first target NF and the at least one second target NF.

According to another aspect of the subject matter described herein, actively learning the NF topology information includes subscribing, by the SCP and with the NRFs located in the different regions, for the NF topology information of the NFs located in the different regions.

According to another aspect of the subject matter described herein, receiving an SBI request message includes receiving an SBI request message requiring delegated discovery according to Third Generation Partnership Project (3GPP) communication model D.

According to another aspect of the subject matter described herein, the method for routing, alternate routing, or load balancing of service-based interface (SBI) request messages includes sending, by the SCP, and on behalf of the consumer NF, an NF discovery request to an NRF, receiving, by the SCP and from the NRF, an NF discovery response including NF topology information of NFs registered with the NRF, wherein determining an NF set-Id of the first target NF includes reading the NF set-Id from an NF profile of the first target NF received in the NF discovery response, and using the NF set-Id and the NF topology information to identify the at least one second target NF includes using the NF set-Id to identify the at least one second target NF from the NF topology information received in response to the subscribing.

According to another aspect of the subject matter described herein, routing, alternate routing, or load balancing the SBI request message includes routing the SBI request message by selecting one of the first target NF and the at least one second target NF as an initial target NF for the SBI request message, and forwarding the SBI request message to the initial target NF.

According to another aspect of the subject matter described herein, receiving an SBI request message includes receiving an SBI request message requiring indirect routing without delegated discovery according to Third Generation Partnership Project (3GPP) communication model C.

According to another aspect of the subject matter described herein, routing, alternate routing, or load balancing includes alternate routing the SBI request message.

According to another aspect of the subject matter described herein, alternate routing the SBI request message includes forwarding the SBI request message to the first target NF, determining that processing of the SBI request message was not successful, and forwarding the SBI request message to the at least one second target NF.

According to another aspect of the subject matter described herein, routing, alternate routing, or load balancing the SBI request message includes load balancing the SBI request message.

According to another aspect of the subject matter described herein, load balancing the SBI request message includes selecting between the first target NF and the at least one second target NF using a load balancing algorithm and forwarding the SBI request message to the selected target NF.

According to another aspect of the subject matter described herein, a system for routing, alternate routing, or load balancing of service-based interface (SBI) request messages among network functions (NFs) that are members of the same NF set and that are located in different regions using a service communication proxy (SCP) is provided. The system includes an SCP including at least one processor and a memory. The system further includes an NF topology discoverer and SBI message router executable by the at least one processor for actively learning, from NF repository functions (NRFs) located in different regions, NF topology information, including NF profiles, of NFs that are located in the different regions, receiving, from a consumer NF, an SBI request message, determining an NF set-Id of a first target NF of the SBI request message, the first target NF being located in a first region, using the NF set-Id and the NF topology information to identify at least one second target NF that is in the same NF set as the first target NF and located in a different region from the first region, and routing, alternate routing, or load balancing the SBI request message to at least one of the first target NF and the at least one second target NF.

According to another aspect of the subject matter described herein, the NF topology discoverer and SBI message router is configured to actively learn the NF topology information by subscribing, with the NRFs located in the different regions, for the NF topology information of the NFs located in the different regions.

According to another aspect of the subject matter described herein, the SBI request message includes an SBI request message requiring delegated discovery according to Third Generation Partnership Project (3GPP) communication model D.

According to another aspect of the subject matter described herein, the NF topology discoverer and SBI message router is configured to send, on behalf of the consumer NF, an NF discovery request to an NRF, receive, from the NRF, an NF discovery response including NF topology information of NFs registered with the NRF, and determine an NF set-Id of the first target NF by reading the NF set-Id from an NF profile of the first target NF received in the NF discovery response, and use the NF set-Id and the NF topology information to identify the at least one second target NF by using the NF set-Id to identify the at least one second target NF from the NF topology information received in response to the subscribing.

According to another aspect of the subject matter described herein, the NF topology discoverer and SBI message router is configured to route the SBI request message by selecting one of the first target NF and the at least one second target NF as an initial target NF for the SBI request message, and forward the SBI request message to the initial target NF.

According to another aspect of the subject matter described herein, the SBI request message includes an SBI request message requiring indirect routing without delegated discovery according to Third Generation Partnership Project (3GPP) communication model C.

According to another aspect of the subject matter described herein, the NF topology discoverer and SBI message router is configured to alternate route the SBI request message.

According to another aspect of the subject matter described herein, the NF topology discoverer and SBI message router is configured to alternate route the SBI request message by forwarding the SBI request message to the first target NF, determining that processing of the SBI request message was not successful, and forwarding the SBI request message to the at least one second target NF.

According to another aspect of the subject matter described herein, the NF topology discoverer and SBI message router is configured to load balance the SBI request message by selecting between the first target NF and the at least one second target NF using a load balancing algorithm and forwarding the SBI request message to the selected target NF.

According to another aspect of the subject matter described herein, a non-transitory computer readable medium having stored thereon executable instructions that when executed by a processor of a computer controls control the computer to perform steps is provided. The steps include actively learning, by a service communication proxy (SCP) and from network function (NF) repository functions (NRFs) located in different regions, NF topology information, including NF profiles, of NFs that are located in the different regions. The steps further include receiving, by the SCP and from a consumer NF, an SBI request message. The steps further include determining, by the SCP, an NF set-Id of a first target NF of the SBI request message, the first target NF being located in a first region. The steps further include using, by the SCP, the NF set-Id and the NF topology information to identify at least one second target NF that is in the same NF set as the first target NF and located in a different region from the first region. The steps further include routing, alternate routing, or load balancing the SBI request message to at least one of the first target NF and the at least one second target NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
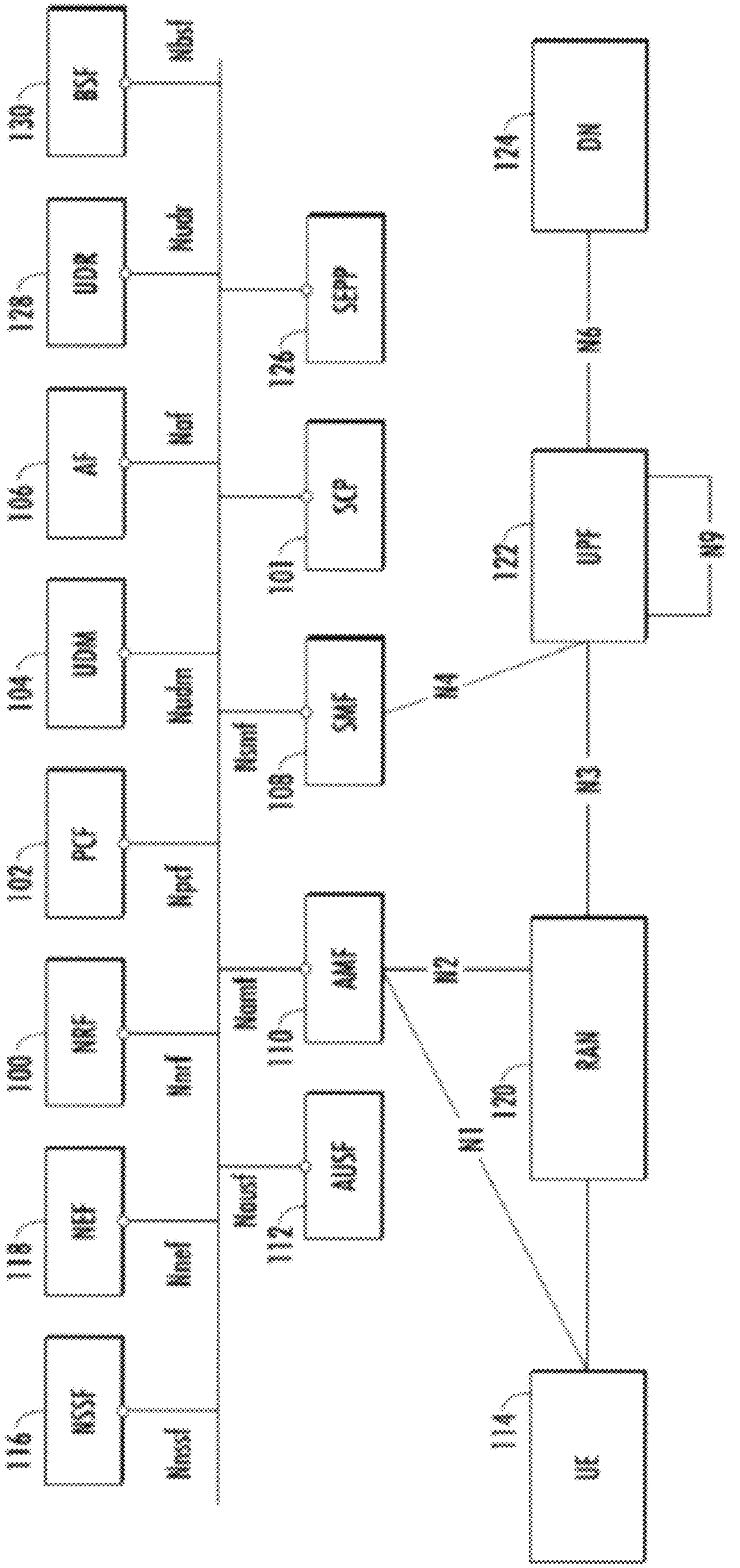
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements.

Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to producer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one issue in 5G, previous generation, and subsequent generation networks is producer NFs in the same NF set can be georedundantly deployed in different regions, registered with different NRFs, and NF service consumers may lack visibility of the producer NFs deployed in the different regions for routing, alternate routing, or load balancing. Before discussing the specifics of the problem and the corresponding solution, 3GPP communication models, NF discovery, and georedundant producer NF deployments will be described.

Figure 2:
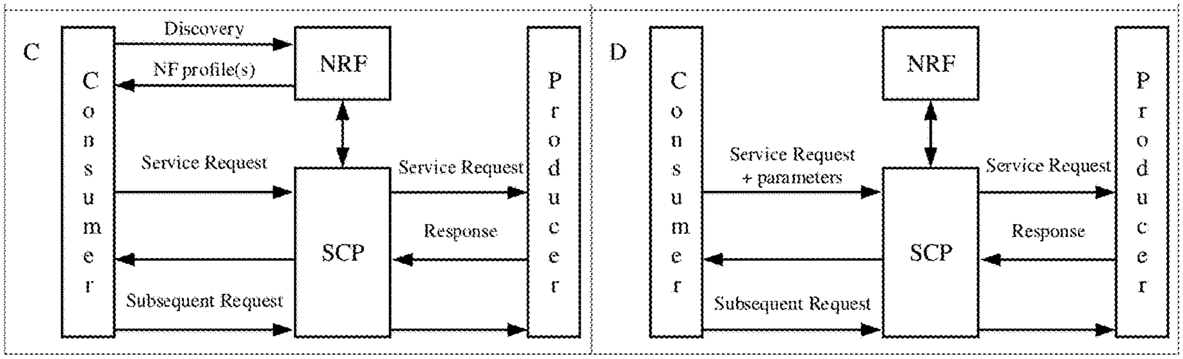
FIG. 2 is a network diagram illustrating message routing according to 3GPP communication model C and 3GPP communication model D.

FIG. 2 is a network diagram illustrating message routing according to 3GPP communication model C and 3GPP communication model D. Referring to FIG. 2, in 3GPP communication model C, consumer NFs conduct NF discovery by querying the NRF. Based on the NF discovery result, the consumer NF selects an NF set or a specific NF instance of an NF instance set. After performing NF discovery, the consumer NF sends the request to the SCP containing the address of the selected service producer pointing to an NF service instance or a set of NF service instances. In the latter case, the SCP selects an NF service instance. If possible, the SCP interacts with the NRF to get selection parameters such as location, capacity, etc. The SCP routes the request to the selected NF service producer instance.

3GPP communication model D is referred to as indirect communication with delegated discovery. According to 3GPP communication model D, consumer NFs do not perform NF discovery or NF selection. The consumer NF adds any necessary discovery and selection parameters required to find a suitable producer for a service request and sends the service request to the SCP. The SCP uses the request address and the discovery and selection parameters in the request message to route the request to a suitable producer instance. The SCP can perform discovery with an NRF and obtain a discovery result. The SCP then uses the discovery result to perform NF selection on behalf of the NF service consumer.

Figure 3:
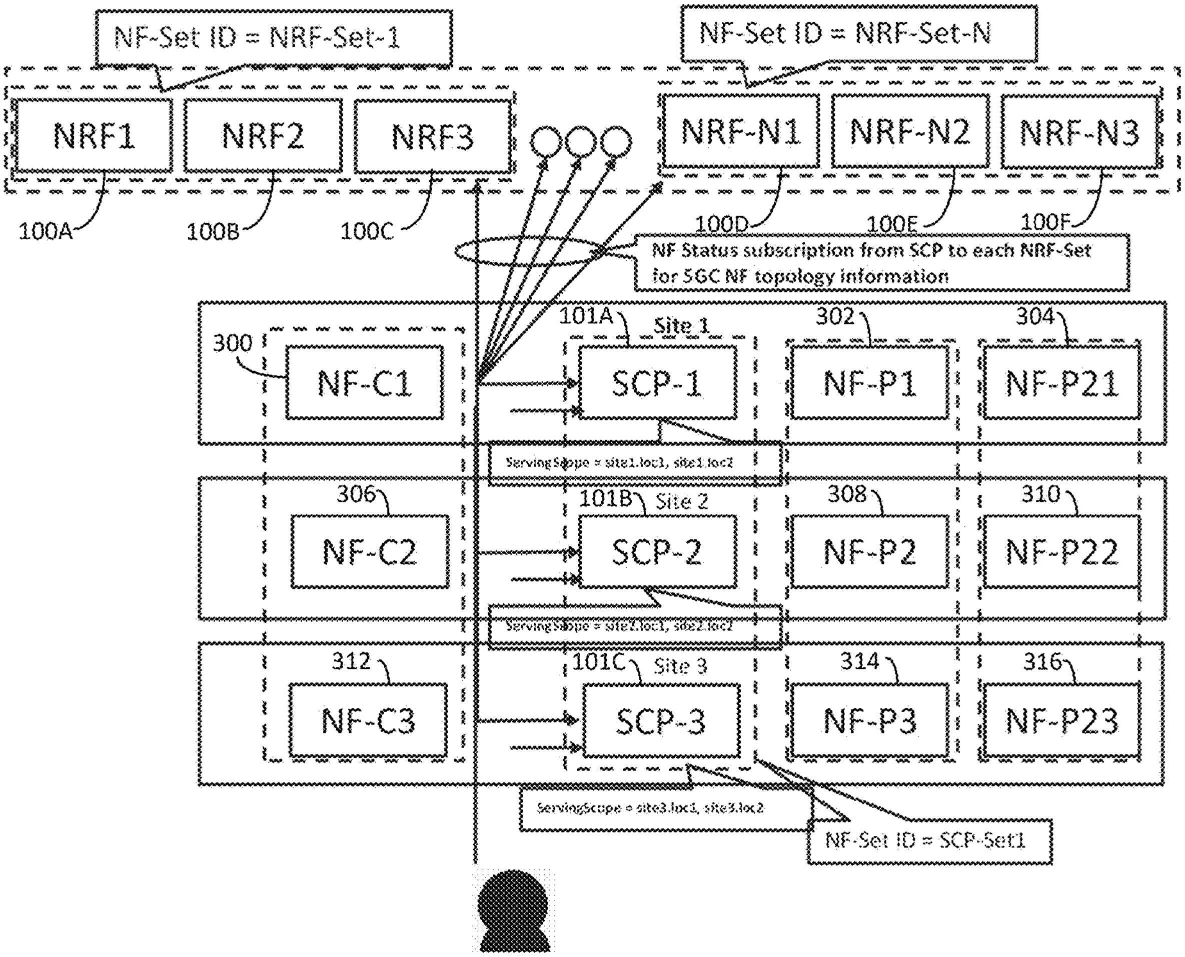
FIG. 3 is a network diagram illustrating 5G NF topology learning and auditing in a 5G network deployment.

FIG. 3 is a network diagram illustrating 5G NF topology learning and auditing in a 5G network deployment. Referring to FIG. 3, NRFs 100A-100F serve different regions. NF service consumer 300, SCP 101A, and NF service producers 302 and 304 are located in a first site or region. NF service consumer 306, SCP 101B, and NF service producers 308 and 310 are located in a second site or region. NF service consumer 312, SCP 101C, and NF service producers 314 and 316 are located in a third site or region.

Each SCP 101A, 101B, and 101C registers with any available NRF instance (as per priority, capacity) in each configured NRF set as an SCP or as a custom NF type using operator configurable SCP profile configuration using Nnrf_NFManagement Service. Each SCP 101A, 101B, and 101C updates its NF profile as and when needed.

Each SCP 101A, 101B, and 101C subscribes with an available NRF instance (as per priority, capacity) for any NF status change notifications for all 5GC NF types in each configured NRF set using the NFStatusSubscribe, NFStatusUnsubscribe and NFStatusNotify service operations of the Nnrf_NFManagement service. One point to highlight is that each SCP 101A, 101B, and 101C learns the 5G NF topology deployed in the network via NF status notifications from the NRF.

Each SCP 101A, 101B, and 101C performs periodic 5G NF topology audits with any one available NRF instance (as per priority, capacity) in each configured NRF set using the Nnrf_NFManagement or Nnrf_NFDiscovery service as an audit service at the SCP. Each SCP periodically synchronizes the current available/learned 5G NF topology information at the SCP with NF topology information available at the NRF and takes corrective actions, if any mismatch/gap is found between the two. After a successful audit, the 5G NF topology at the SCP will be synchronized with the NF topology information received from the NRF during the audit.

Another way that the SCP learns NF topology information is via the Nnrf_NFDiscovery service through the corresponding NFDiscover service operation performed on behalf of NF service consumers. The Nnrf_NFDiscovery service allows an NF or SCP instance to discover other NF instances with the potential services they offer or to discover SEPP instances in the same PLMN, by querying the local NRF.

The Nnrf_NFDiscovery service also allows:

- an SCP to discover other SCP instances; and
- an NF or SCP to discover the list of NRF instances that are part of the NRF set with, for each NRF instance, its NRF instance Id and addressing information, if the NRF is part of an NRF set.

The Nnrf_NFDiscovery service also allows an NRF in a PLMN to re-issue a discovery request towards an NRF in another PLMN (e.g., the HPLMN of a certain UE).

The NFDiscover service operation provides to the NF service consumer or SCP the profile (including IP address(es) or FQDN) of the NF instance(s) or NF service(s) or SEPP instances matching certain input criteria. The NFDiscover service operation also provides to the SCP the profile (including IP address(es) or FQDN) of the SCP Instance(s) matching certain input criteria. The NFDiscover service operation discovers the set of NF instances (and their associated NF service instances), represented by their NF profiles, that are currently registered in an NRF and satisfy a number of input query parameters. Various NF discovery scenarios will now be described.

Figure 4:
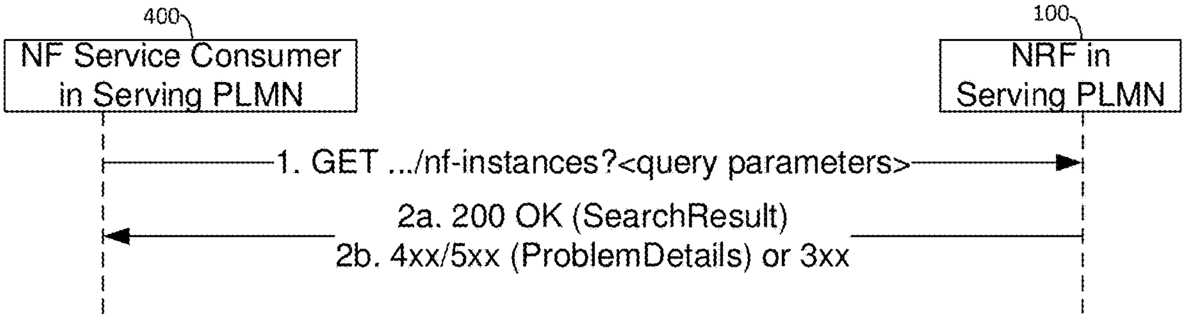
FIG. 4 is a message flow diagram illustrating exemplary messages exchanged for the NF discover service operation when the NF service consumer and the NRF are in the same PLMN.

FIG. 4 is a message flow diagram illustrating exemplary messages exchanged for the NF discover service operation when the NF service consumer and the NRF are in the same PLMN. In FIG. 4, an NF service consumer 400 located in the same PLMN as NRF 100 invokes the NF discovery service operation by sending an NF discovery request to NRF 100. NRF 100 responds to the NF discovery request with NF profiles of NFs that match query parameters in the NF discovery request. If an error occurs or if the NF discovery request is redirected, NRF 100 responds with a 4xx or 5xx message indicating problem details or a 3xx message indicating redirection.

Figure 5:
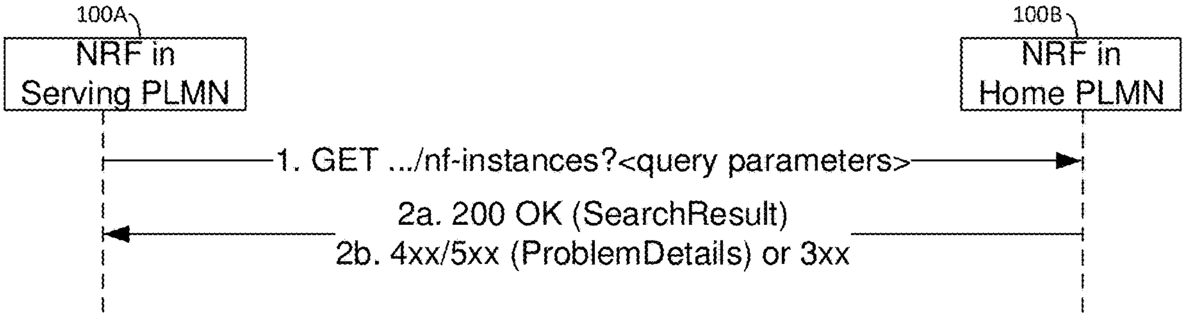
FIG. 5 is a message flow diagram illustrating exemplary messages exchanged for the NF discover service operation for service discovery in a different PLMN.

FIG. 5 is a message flow diagram illustrating exemplary messages exchanged for the NF discover service operation for service discovery in a different PLMN. Service discovery in a different PLMN is invoked by querying the nf-instances resource in the NRF of the home PLMN (NRF 100B in FIG. 5). In FIG. 5, NRF 100A sends an NF discovery request to NRF 100B. NRF 100B responds with a 2xx response containing NF profiles of producer NFs having attributes that match the query parameters, a 4xx or 5xx response indicating problem details, or a 3xx response indicating redirection.

Figure 6:
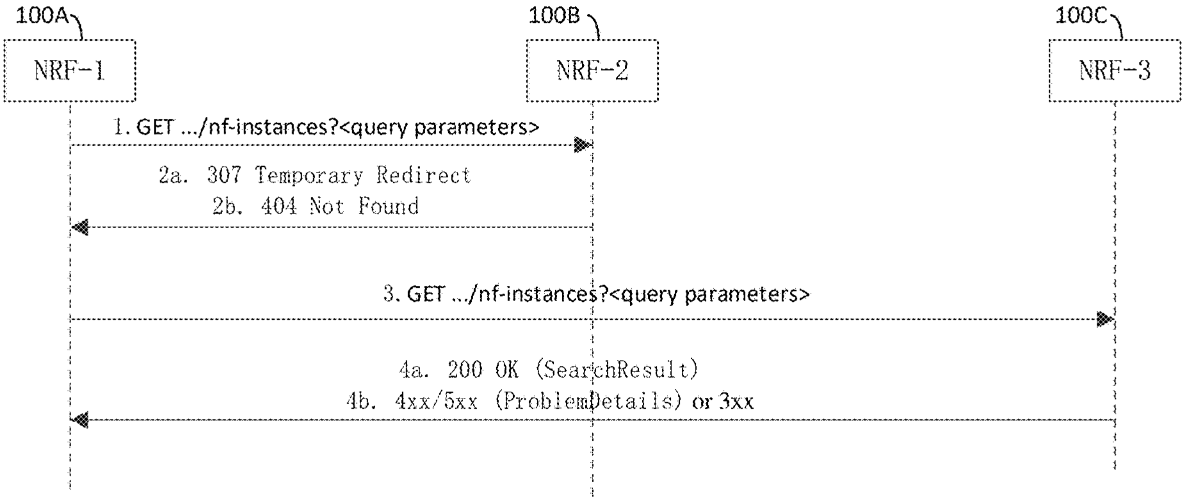
FIG. 6 is a message flow diagram illustrating exemplary messages exchanged for the NF discover service operation with an intermediate redirecting NRF.

FIG. 6 is a message flow diagram illustrating exemplary messages exchanged for the NF discover service operation with an intermediate redirecting NRF. When multiple NRFs are deployed in one PLMN, one NRF may query the nf-instances resource in a different NRF so as to fulfil the service discovery request from an NF service consumer. The query between these two NRFs is redirected by a third NRF. In FIG. 6, NRF 100B is the redirecting NRF because NRF 100B redirects NRF 100A to send an NF discovery request to NRF 100C.

Figure 7:
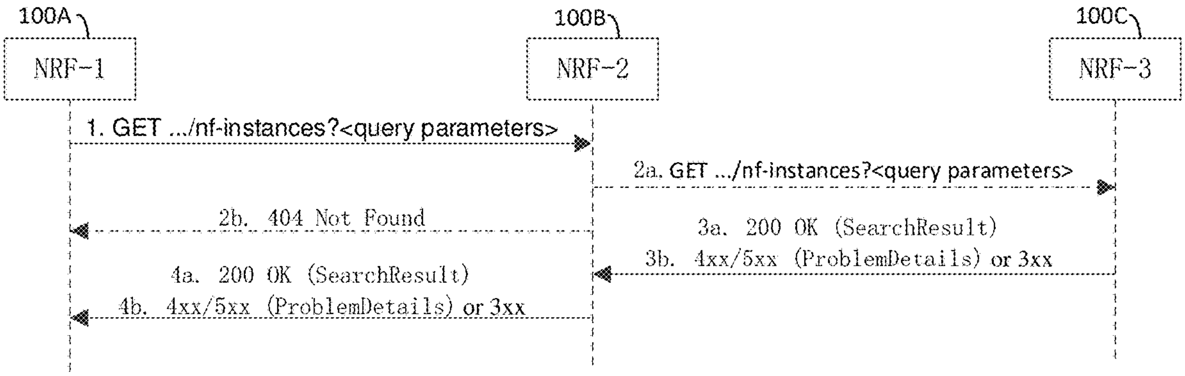
FIG. 7 is a message flow diagram illustrating exemplary messages exchanged for the NF discover service operation with an intermediate forwarding NRF.

FIG. 7 is a message flow diagram illustrating exemplary messages exchanged for the NF discover service operation with an intermediate forwarding NRF. When multiple NRFs are deployed in one PLMN, one NRF may query the nf-instances resource in a different NRF to fulfil the service discovery request from an NF service consumer. The query between these two NRFs is forwarded by a third NRF. In FIG. 7, NRF 100B is the intermediate forwarding NRF because NRF 100B forwards the NF discovery request from NRF 100A to NRF 100C.

One point to highlight is that, in the cases illustrated in FIGS. 4-7, the NF discovery service request is processed, and the NF discovery response is generated by a single NRF instance, irrespective of forwarding, redirection, or the number of hops. As per 3GPP TS 29.510, the NRF specification, it is expected that, for a service request, the NF profiles of all probable NF service producers will be returned in a single NF discovery response by an NRF instance that is ultimately servicing the NF discovery request. However, as will be described in more detail below, this may not be the case when an NRF only contains a view of the NF topology in its particular region.

Figure 8:
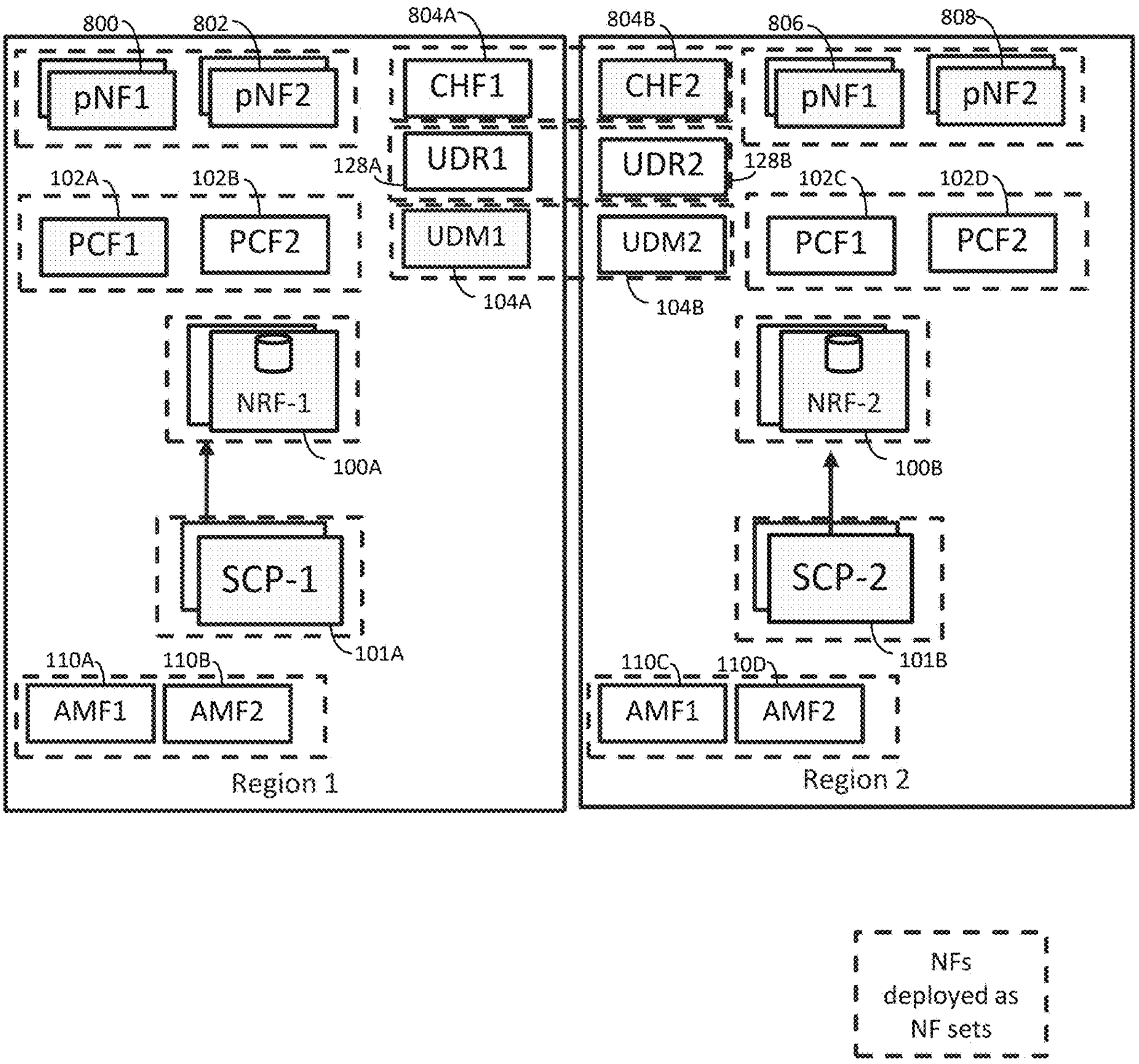
FIG. 8 is a network diagram illustrating an exemplary NF deployment in which producer NF set mates are deployed in different regions.

FIG. 8 is a network diagram illustrating an exemplary NF deployment in which producer NF set mates are deployed in different regions. In one example, a nationwide 5GC network of a mobile network operator (MNO) may be divided into N regions, where N is an integer of at least two. Each region represents a geographic area. In some examples, NF instances may be georedundantly deployed in different regions. In the example in FIG. 8, region 1 includes AMFs 110A and 110B, SCP 101A, NRF 100A, PCFs 102A and 102B, producer NFs 800 and 802, charging function (CHF) 804A, UDR 128A, and UDM 104A. Similarly, region 2 includes AMFs 110C and 110D, SCP 101B, NRF 100B, PCFs 102C and 102D, producer NFs 806 and 808, CHF 804B, UDR 128B, and UDM 104B. CHFs 804A and 804B, UDRs 128A and 128B, and UDMs 104A and 104B are georedundantly deployed such that members of the same CHF, UDR, or UDM set are located in different regions. In addition, AMFs 110A-110D, SCPs 101A and 101B, PCFs 102A and 102B, PCFs 102A-102D and producer NFs 800, 802, 806 and 808 are redundantly deployed within each region.

In some examples, NFs deployed in different regions may be members of the same NF set. For example, CHFs 804A and 804B may be deployed in different regions and may be members of the same NF set, UDRs 128A and 128B may be deployed in different regions and may be members of the same NF set, and UDMs 104A and 104B may be deployed in different regions and may be members of the same NF set. The decision to have members of the same NF set deployed in different regions may be due to existing 4G/3G network deployments, e.g., a common subscriber database across a UDM and a home subscriber server (HSS). Some NF deployments may be such that different regions may have NFs of the same type but from different vendors. For example, region 1 may have an NRF from vendor 1, and region 2 may have an NRF from vendor 2. It is the network operator's choice/decision to use NFs from different vendors and dedicate some regions to a particular vendor for defined NF types e.g., NRF, SMF, PCF, etc. This decision may be to avoid being dependent on a single vendor or other factors.

Figure 9:
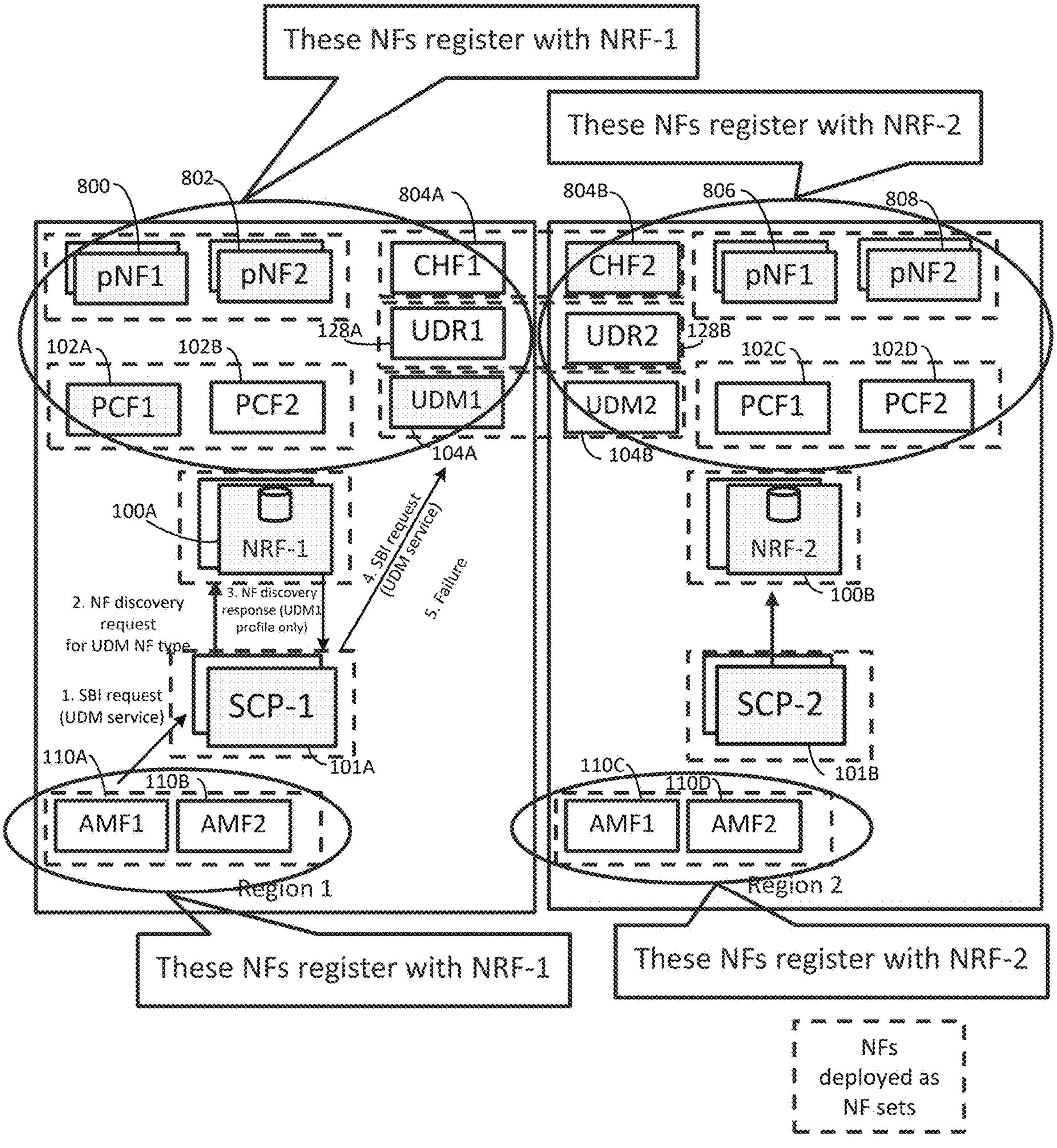
FIG. 9 is a network diagram illustrating NF registration and NF discovery in the network deployment illustrated in FIG. 8.

FIG. 9 is a network diagram illustrating NF registration and NF discovery in the network deployment illustrated in FIG. 8. As illustrated in FIG. 9, each deployed NF registers with its local NRF, i.e., the NRF deployed in its respective region. NFs deployed in region 1, including UDM 104A, UDR 128A, and CHF 804A, will register with NRF 100A. NFs deployed in region 2, including UDM 104B, UDR 128B and CHF 804B, will register with NRF 100B.

In one example, NRF 100A in region 1 may be provided by a different vendor that than NRF 100B in region 2. NRFs 100A and 100B may not share 5G NF profile information with each other, so each NRF 100A and 100B will have 5G NF topology information limited to the NFs in its respective region. NRFs 100A and 100B are not members of the same NRF set.

It should be noted that each NRF/NRF set will have NF profile information only for georedundant NFs which are deployed within the same region as the NRF. The NF profile information includes PCF, AMF and SMF profile information corresponding to their NF set Ids. Each NRF 100A and 100B will only have a partial view of NF profiles for georedundant NFs which are deployed across the regions. NRF 100A will only have NF profile information including NF set Ids for UDM 104A, UDR 128A and CHF 804A. NRF 100B will only have NF profile information including NF set Ids for UDM 104B, UDR 128B and CHF 804B.

Consider a scenario illustrated by step 1 in FIG. 9 in which AMF 110A in region 1 sends a delegated discovery request (e.g., in response to a UE registration) to SCP 101A for a UDM NF type. In step 2, SCP 101A performs NF discovery for the UDM NF type from NRF 100A. In step 3, NRF 100A returns an NF discovery response including the NF profile of UDM 104A. Note that the NF profile of UDM 104B is not present in the NF discovery response from NRF 100A, since NRF 100A is not aware of UDM 104B.

Routing, alternate routing, or load balancing to UDM 104B is not possible, SCP 101A selects UDM 104A for request routing, and, in step 4, forwards the request to UDM 104A. In step 5, processing of the SBI request in step 4 fails, for example, because UDM 104A is not available or returns an error response. SCP 101A is not able to alternate route the request to UDM 104B as the NF profile of UDM 104B is not available in the NF discovery response received from NRF 100A in step 3.

Another problematic case when georedundant NFs are deployed in different regions is load balancing. In FIG. 9, load balancing across UDM 104A and UDM 104B is not possible. If request load balancing is expected between UDM 104A and UDM 104B, SCP 101A cannot perform such load balancing because the NF profile of UDM 104B is not included in the NF discovery response from NRF 100A, even though UDM 104B and UDM 104A are members of the same NF set.

As per 3GPP TS 29.510, it is expected that, for a service request, all possible NF service producers will be returned in a single NF discovery response by an NRF instance that is ultimately servicing the NF discovery request. There is no defined mechanism/guidance for aggregating NF discovery results into a single NF discovery response when an NF discovery request is forked into multiple NF discovery requests and forwarded to different NRF instances. In summary, there is no mechanism/guidance provided in 3GPP specifications regarding aggregation of NF discovery responses from different NRF instances for a single received NF discovery request.

To address these and other difficulties, an SCP may obtain and aggregate NF topology information from NRFs in different regions and use the aggregated NF topology information for routing, alternate routing, and load balancing of SBI request messages.

According to the proposed solution, an SCP learns the 5G NF topology from different NRFs deployed in the 5GC network using the NF topology audit/learning procedure described above with regard to FIG. 3. Using this procedure, the SCP will have NF profile information for NFs deployed in different regions, including the NF profiles of the UDM, CHF and UDR, which have NF set mates deployed in different regions. The SCP may be configured to contact particular NRFs based on NF type or other criteria specified in a received SBI request requiring delegated discovery according to 3GPP communication model D. For example, if the discovery selection criteria indicate NFType=UDM, the SCP may be configured to use NRF 100A as the primary source and NRF 100B as the secondary source for NF discovery. Continuing with the delegated discovery example, the SCP creates the NF discovery request based on the received discovery header in the delegated discovery request and selects the NRF from the above-described configuration. The SCP may contact the NRF as per priority, capacity, and availability of the NRFs. For example SCP 101A may first contact NRF 100A and, if an error response or no response is received, SCP 101A may contact NRF 100B for NF discovery.

The SCP will receive the NF discovery response from NRF, and the NF discovery response will have the NF profiles of only locally registered NF instance(s). For example, NRF 100A may return an NF discovery response having the NF profile of UDM 104A. The NF profile of UDM 104B is not present in NF discovery response from NRF 100A, since NRF 100A is not aware of UDM 104B.

To enable routing and alternate routing to NFs across regions and load balancing among NFs across regions, SCP 101A may be enhanced to identify the NF-set Id from a received NF profile in NF discovery response. For example, SCP 101A may identify NF set-1 from the NF profile of UDM 104A returned by NRF 100A. SCP 101A may use the 5G NF topology learned from NRFs through the auditing process to identify the NF instances deployed in the network (across the regions) which are part of same NF set(s) as the NF-set Ids contained in the NF discovery response. For example, SCP 101A may identify the NF profiles of UDM 104A and UDM 104B which are part of the same NF set and are deployed in different regions. SCP 101A may use the combined NF topology information obtained from (1) the NF discovery response and (2) the NF topology learning process illustrated in FIG. 3 for routing, alternate routing and load balancing. For example, SCP 101A may use UDM 104A (whose NF profile was learned from the NF discovery response) and UDM 104B (whose NF profile was learned from the NF topology learning procedure and identified using the NF-set Id obtained from the NF profile of UDM 104A.

Figure 10:
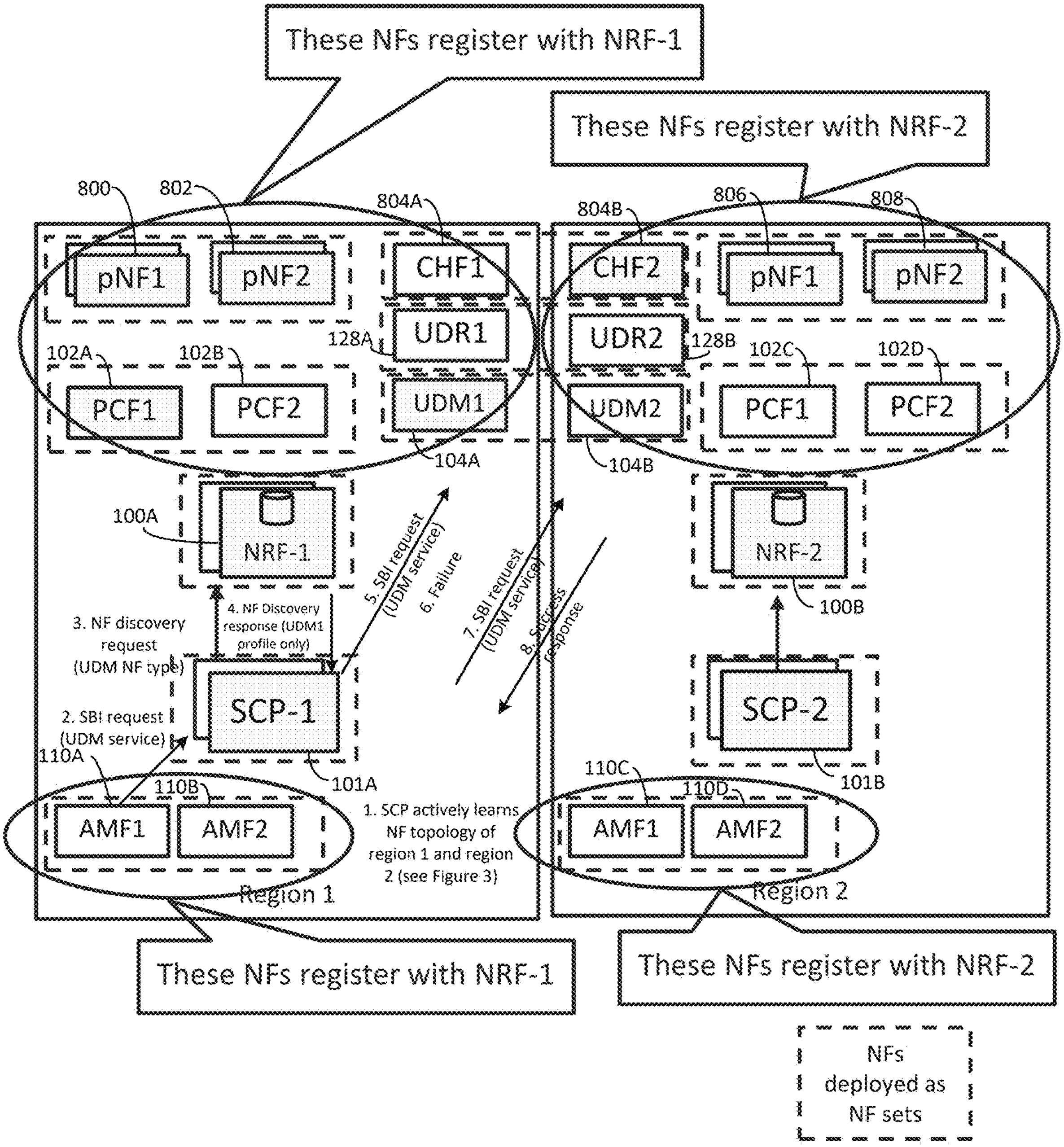
FIG. 10 illustrates an alternate routing scenario for 3GPP communication model D where the SCP uses NF profile information learned from NF discovery and NF topology audit procedures.

FIG. 10 illustrates an alternate routing scenario for 3GPP communication model D where the SCP uses NF profile information learned from NF discovery and NF topology audit procedures. Referring to FIG. 10, in step 1, SCP 101A actively learns NF topology information for producer NF instances located in different regions. This step may be accomplished by the SCP subscribing with the NRFs in the different regions to receive NF topology information from the NRFs in the different regions, receiving subscribe notification request messages including the NF topology information, and storing the NF topology information in a database local to SCP 101A. In step 2, SCP 101A receives an SBI request requiring delegated discovery and UDM service. In step 3, SCP 101A performs the delegated discovery by sending an NF discovery request with query parameters identifying the UDM NF type to NRF 100A. In step 4, NRF 100A sends an NF discovery response with the NF profile of UDM 104A to SCP 101A. In step 5, SCP 101A forwards the SBI request to UDM 104A. In step 6, processing of the SBI request fails. In step 7, SCP 101A uses the NF set-Id from the NF discovery response and the stored NF topology information from region 2 to identify UDM 104B as an NF set mate of UDM 104A and, in step 7, alternate routes the NF SBI request to UDM 104B. In step 8, UDM 104B successfully processes the SBI request and returns a success response.

In addition to alternate routing, SCP 101A may use the NF topology information learned from different regions for load balancing of SBI requests among NF set mates located in different regions. An example load balancing scenario may include steps 1-4 in FIG. 10. In step 11, SCP 101A may select between UDM 104A and 104B for processing a given SBI request using a load balancing algorithm, such as round-robin or weighted round-robin NF selection, and forward the SBI request to the selected UDM. The process may be repeated for subsequently received SBI requests requiring UDM service.

Further, SCP 101A may use the NF topology information learned from different regions to perform routing, i.e., initial routing, of an SBI request message to potential target NFs located in different regions. To perform such enhanced routing, SCP 101A may receive an SBI request message requiring delegated discovery and UDM service, identify UDM 104A as a potential target NF and the NF-set Id of UDM 104A from the NF discovery response. SCP 101A may use the NF set-Id to identify additional target NFs located in different regions from the learned network topology information using the subscription procedure illustrated in FIG. 3. SCP 101A may then select among the potential target NFs located in the different regions according to priority, capacity, or other attributes and route the SBI request message to the selected target NF.

Figure 11:
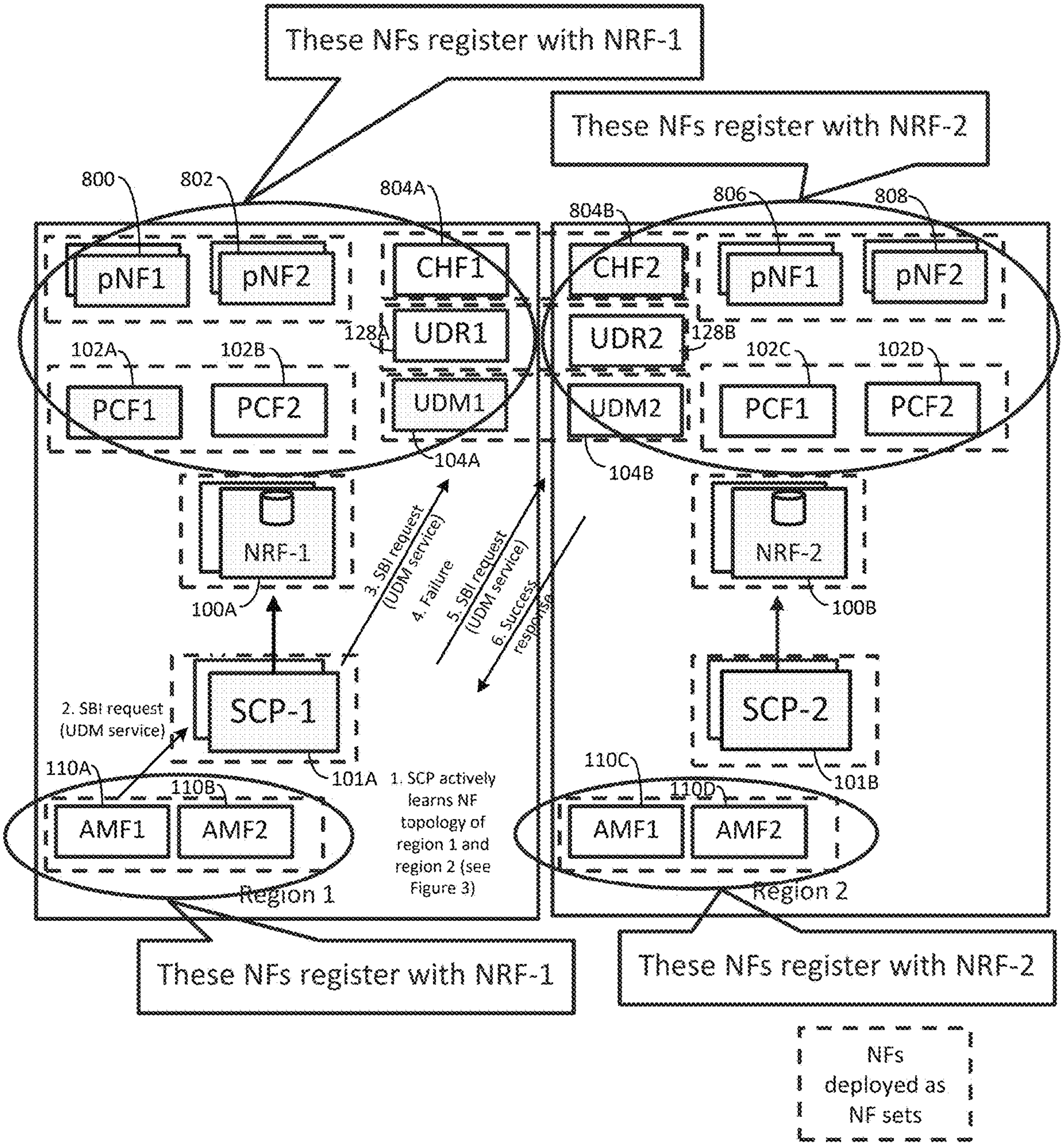
FIG. 11 illustrates the use of NF topology information regarding NF set mates deployed in different regions for indirect routing without delegated discovery according to 3GPP communication model C.

FIG. 10 illustrates the use of NF topology information regarding NF set mates deployed in different regions for indirect routing with delegated discovery according to 3GPP communication model D. However, the subject matter described herein is not limited to using NF topology information regarding NF set mates deployed in different regions for indirect routing with delegated discovery according to 3GPP communication model D. In an alternate example, the NF topology information regarding NF set mates deployed in different regions may be used by an SCP for indirect communications without delegated discovery according to 3GPP communication model C. FIG. 11 illustrates the use of NF topology information regarding NF set mates deployed in different regions for indirect routing without delegated discovery according to 3GPP communication model C. Referring to FIG. 11, in step 1, SCP 101A actively learns NF topology information for producer NF instances located in different regions. This step may be accomplished by the SCP subscribing with the NRFs in the different regions to receive NF topology information from the NRFs in the different regions, receiving subscribe notification request messages including the NF topology information, and storing the NF topology information in a database local to SCP 101A. In step 2, SCP 101A receives an SBI request requiring UDM service and that is addressed to UDM 104A (no delegated discovery required). In step 3, SCP 101A forwards the SBI request to UDM 104A. In step 4, processing of the SBI request fails. In step 5, SCP 101A uses the stored NF topology information from region 2 to identify UDM 104B as an NF set mate of UDM 104A and, in step 5, alternate routes the NF discovery request to UDM 104B. In step 6, UDM 104B successfully processes the SBI request and returns a success response.

Like the load balancing example for 3GPP communication model D, SCP 101A may also use learned NF topology information for load balancing SBI requests according to 3GPP communication model C. An example load balancing scenario may include steps 1 and 2 in FIG. 11. In step 3, SCP 101A may select between UDMs 104A and 104B for processing a given SBI request using a load balancing algorithm and forward the SBI request to the selected UDM. The process may be repeated for subsequently received SBI requests.

SCP 101A may also use the learned NF topology information of NF set mates deployed in different regions for initial routing of an SBI request according to 3GPP communication model C. In one example scenario, SCP 101A may receive an SBI request requiring indirect routing without delegated discovery according to the 3GPP communication model C. The SBI request may be addressed to UDM 104A. SCP 101A may use the NF instance Id of UDM 104A from the SBI request to determine the NF set-Id of UDM 104A from the NF profile of UDM 104A. SCP 101A may use the NF set-Id of UDM 104A to identify UDM 104B as an NF set mate of UDM 104A. SCP 101A may then route the SBI request to UDM 104A or UDM 104B based on priority, capacity, or other criteria.

Figure 12:
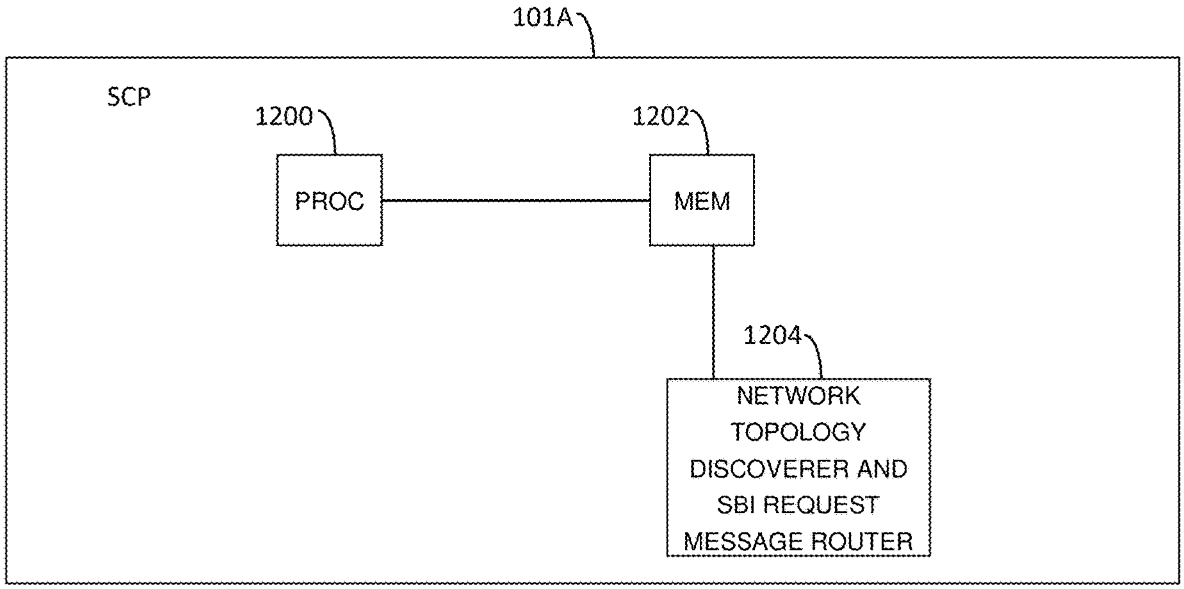
FIG. 12 is a block diagram illustrating an exemplary architecture for an SCP that identifies and routes messages to producer NF set mates located in different regions.

FIG. 12 is a block diagram illustrating an exemplary architecture for an SCP for performing routing, alternate routing, and load balancing of SBI requests among NF set mates located in different regions. Referring to FIG. 12, SCP 101A includes at least one processor 1200 and a memory 1202. SCP 101A further includes an NF topology discoverer and SBI request message router 1204 for discovering NF topology information for NF set mates located in different regions and using the NF topology information for routing, alternate routing, and load balancing of SBI request message. NF topology discoverer and SBI request message router 1204 may be implemented using computer executable instructions stored in memory 1202 and executed by processor 1200.

Figure 13:
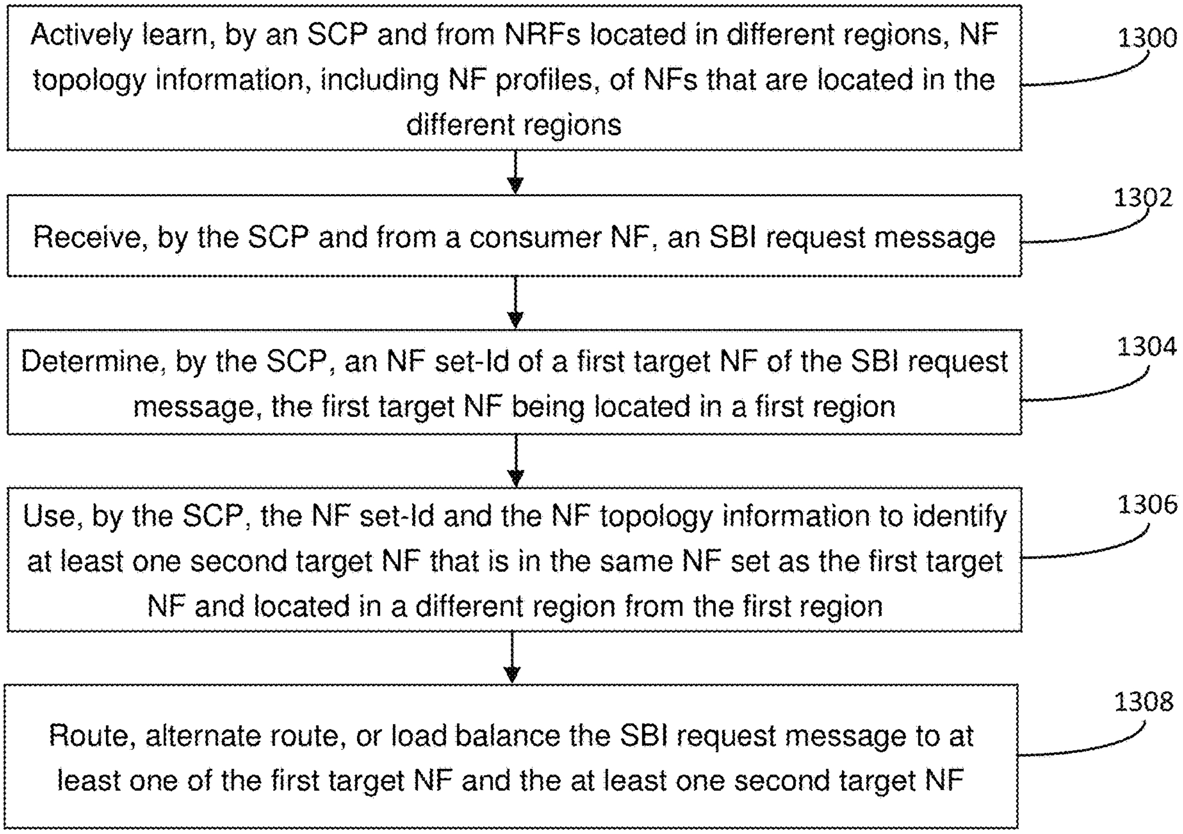
FIG. 13 is a flow chart illustrating an exemplary process for identifying and routing messages to NF set mates located in different regions.

FIG. 13 is a flow chart illustrating an exemplary process for routing, alternate routing, or load balancing of SBI request messages among NFs that are members of the same NF set and that are located in different regions using an SCP. Referring to FIG. 13, in step 1300, the process includes actively learning, by an SCP and from NRFs located in different regions, NF topology information, including NF profiles, of NFs that are located in the different regions. For example, an SCP, such as SCP 101A, may subscribe with NRFs in different regions to receive NF topology information regarding NFs registered with the NFs in the different regions, receive the NF topology information in NF status notification request messages, and store the NF topology information in a database local to SCP 101A.

In step 1302, the process further includes receiving, by the SCP and from a consumer NF, an SBI request message. For example, an SCP, such as SCP 101A, may receive an SBI request requiring indirect routing and delegated discovery according to 3GPP communication model D or requiring indirect routing without delegated discovery according to 3GPP communication model C.

In step 1304, the process further includes determining, by the SCP, an NF set-Id of a first target NF of the SBI request message, the first target NF being located in a first region. For example, an SCP, such as SCP 101A, in the case of delegated discovery, may read an NF set-Id from an NF profile of a target NF received in an NF discovery response. In the case of indirect routing without delegated discovery, the SCP may determine the NF set-Id by using the NF instance Id of an SBI request to perform a lookup for the NF set-Id in stored NF topology information maintained by the SCP.

In step 1306, the process further includes using, by the SCP, the NF set-Id and the NF topology information to identify at least one second target NF that is in the same NF set as the first target NF and located in a different region from the first region. For example, an SCP, such as SCP 101A, may utilize the NF set-Id to perform a lookup in NF topology information maintained by the SCP to identify target NFs in different regions that are members of the same NF set.

In step 1308, the process further includes routing, alternate routing, or load balancing the SBI request message to at least one of the first target NF and the at least one second target NF. For example, an SCP, such as SCP 101A, may route, alternate route, or load balance an SBI request message to any of the target NF instances identified in step 1306.

Exemplary advantages of the subject matter described herein include enabling the routing, alternate routing and load balancing to all NFs across regions in the 5GC network. Another advantage of the subject matter described herein is reducing the likelihood of 5G core network signaling outages caused by local NRF or producer NF instance failure when NF set mates are deployed across geographic regions. The subject matter described herein enables multi-vendor NRF/NF deployments across the regions in 5GC network. The subject matter described herein improves network resilience, as SCP is enabled for routing, alternate routing, and load balancing to NFs across regions in the 5GC network.

The disclosure of each of the following references is incorporated herein by reference in its entirety.

REFERENCES 1. 3rd Generation Partnership Project; Technical Specification Group Services and System Aspects; System architecture for the 5G System (5GS); Stage 2 (Release 19) 3GPP TS 23.501 V19.1.0 (2024-09)
2. 3rd Generation Partnership Project; Technical Specification Group Core Network and Terminals; 5G System;

Network Function Repository Services; Stage 3 (Release 18) 3GPP TS 29.510 V19.0.0 (2024-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing, alternate routing, or load balancing of service-based interface (SBI) request messages among network functions (NFs) that are members of the same NF set and that are located in different regions using a service communication proxy (SCP), the method comprising:

actively learning, by an SCP and from NF repository functions (NRFs) located in different regions, NF topology information, including NF profiles, of NFs that are located in the different regions, wherein each of the NRFs stores NF profiles of NFs located in a region of the NRF but not NF profiles of NFs located in regions outside of the region of the NRF, and actively learning the NF profiles of NFs that are located in the different regions includes auditing, by the SCP, a first NRF in a first region to obtain NF profiles of NFs in the first region and auditing, by the SCP, a second NRF in a second region to obtain NF profiles of NFs in the second region;

receiving, by the SCP and from a consumer NF, an SBI request message;

determining, by the SCP, an NF set-Id of a first target NF of the SBI request message, the first target NF being located in the first region;

using, by the SCP, the NF set-Id and the NF topology information to identify at least one second target NF that is in the same NF set as the first target NF and located in the second region; and routing, alternate routing, or load balancing the SBI request message to at least one of the first target NF and the at least one second target NF.

2. The method of claim 1, wherein actively learning the NF topology information includes subscribing, by the SCP and with the NRFs located in the different regions, for the NF topology information of the NFs located in the different regions.

3. The method of claim 2, wherein receiving an SBI request message includes receiving an SBI request message requiring delegated discovery according to Third Generation Partnership Project (3GPP) communication model D.

4. The method of claim 3, comprising, sending, by the SCP, and on behalf of the consumer NF, an NF discovery request to an NRF, receiving, by the SCP and from the NRF, an NF discovery response including NF topology information of NFs registered with the NRF, wherein determining an NF set-Id of the first target NF includes reading the NF set-Id from an NF profile of the first target NF received in the NF discovery response, and using the NF set-Id and the NF topology information to identify the at least one second target NF includes using the NF set-Id to identify the at least one second target NF from the NF topology information received in response to the subscribing.

5. The method of claim 1, wherein routing, alternate routing, or load balancing the SBI request message includes routing the SBI request message by selecting one of the first target NF and the at least one second target NF as an initial target NF for the SBI request message, and forwarding the SBI request message to the initial target NF.

6. The method of claim 1, wherein receiving an SBI request message includes receiving an SBI request message requiring indirect routing without delegated discovery according to Third Generation Partnership Project (3GPP) communication model C.

7. The method of claim 1, wherein routing, alternate routing, or load balancing includes alternate routing the SBI request message.

8. The method of claim 7, wherein alternate routing the SBI request message includes forwarding the SBI request message to the first target NF, determining that processing of the SBI request message was not successful, and forwarding the SBI request message to the at least one second target NF.

9. The method of claim 1, wherein routing, alternate routing, or load balancing the SBI request message includes load balancing the SBI request message.

10. The method of claim 9, wherein load balancing the SBI request message includes selecting between the first target NF and the at least one second target NF using a load balancing algorithm and forwarding the SBI request message to the selected target NF.

11. A system for routing, alternate routing, or load balancing of service-based interface (SBI) request messages among network functions (NFs) that are members of the same NF set and that are located in different regions using a service communication proxy (SCP), the system comprising:

an SCP including at least one processor and a memory; and an NF topology discoverer and SBI message router executable by the at least one processor for actively learning, from NF repository functions (NRFs) located in different regions, NF topology information, including NF profiles, of NFs that are located in the different regions, wherein each of the NRFs stores NF profiles of NFs located in a region of the NRF but not NF profiles of NFs located in regions outside of the region of the NRF, and actively learning the NF profiles of NFs that are located in the different regions includes auditing, by the SCP, a first NRF in a first region to obtain NF profiles of NFs in the first region and auditing, by the SCP, a second NRF in a second region to obtain NF profiles of NFs in the second region, the NF topology discoverer and message router for receiving, from a consumer NF, an SBI request message, determining an NF set-Id of a first target NF of the SBI request message, the first target NF being located in the first region, using the NF set-Id and the NF topology information to identify at least one second target NF that is in the same NF set as the first target NF and located in the second region, and routing, alternate routing, or load balancing the SBI request message to at least one of the first target NF and the at least one second target NF.

12. The system of claim 11, wherein the NF topology discoverer and SBI message router is configured to actively learn the NF topology information by subscribing, with the NRFs located in the different regions, for the NF topology information of the NFs located in the different regions.

13. The system of claim 12, wherein the SBI request message includes an SBI request message requiring delegated discovery according to Third Generation Partnership Project (3GPP) communication model D.

14. The system of claim 13, wherein the NF topology discoverer and SBI message router is configured to send, on behalf of the consumer NF, an NF discovery request to an NRF, receive, from the NRF, an NF discovery response including NF topology information of NFs registered with the NRF, and determine an NF set-Id of the first target NF by reading the NF set-Id from an NF profile of the first target NF received in the NF discovery response, and use the NF set-Id and the NF topology information to identify the at least one second target NF by using the NF set-Id to identify the at least one second target NF from the NF topology information received in response to the subscribing.

15. The system of claim 11, wherein the NF topology discoverer and SBI message router is configured to route the SBI request message by selecting one of the first target NF and the at least one second target NF as an initial target NF for the SBI request message, and forward the SBI request message to the initial target NF.

16. The system of claim 11, wherein the SBI request message includes an SBI request message requiring indirect routing without delegated discovery according to Third Generation Partnership Project (3GPP) communication model C.

17. The system of claim 11, wherein the NF topology discoverer and SBI message router is configured to alternate route the SBI request message.

18. The system of claim 17, wherein the NF topology discoverer and SBI message router is configured to alternate route the SBI request message by forwarding the SBI request message to the first target NF, determining that processing of the SBI request message was not successful, and forwarding the SBI request message to the at least one second target NF.

19. The system of claim 11, wherein the NF topology discoverer and SBI message router is configured to load balance the SBI request message by selecting between the first target NF and the at least one second target NF using a load balancing algorithm and forwarding the SBI request message to the selected target NF.

20. A non-transitory computer readable medium having stored thereon executable instructions that when executed by a processor of a computer control the computer to perform steps comprising:

actively learning, by a service communication proxy (SCP) and from network function (NF) repository functions (NRFs) located in different regions, NF topology information, including NF profiles, of NFs that are located in the different regions, wherein each of the NRFs stores NF profiles of NFs located in a region of the NRF but not NF profiles of NFs located in regions outside of the region of the NRF, and actively learning the NF profiles of NFs that are located in the different regions includes auditing, by the SCP, a first NRF in a first region to obtain NF profiles of NFs in the first region and auditing, by the SCP, a second NRF in a second region to obtain NF profiles of NFs in the second region;

receiving, by the SCP and from a consumer NF, an SBI request message;

determining, by the SCP, an NF set-Id of a first target NF of the SBI request message, the first target NF being located in a first region;

using, by the SCP, the NF set-Id and the NF topology information to identify at least one second target NF that is in the same NF set as the first target NF and located in a different region from the first region; and routing, alternate routing, or load balancing the SBI request message to at least one of the first target NF and the at least one second target NF.

* * * * *